Feb. 27, 1951　　　　　E. BARANY　　　　2,543,221
UNIVERSALLY ADJUSTABLE BRACKET ASSEMBLY
Filed Aug. 4, 1945　　　　　　　　　　　2 Sheets-Sheet 1
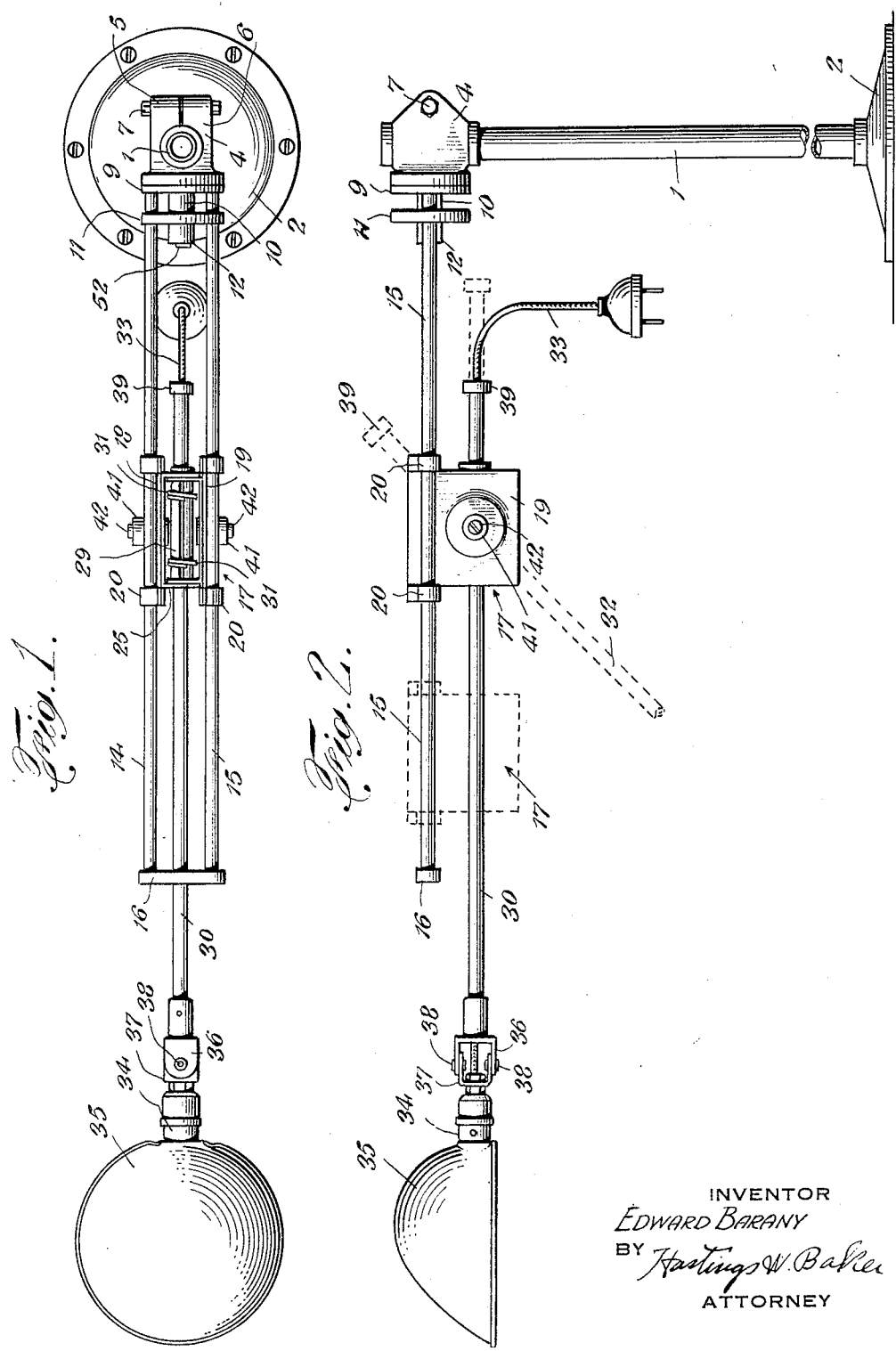
INVENTOR
*Edward Barany*
BY *Hastings W. Baker*
ATTORNEY

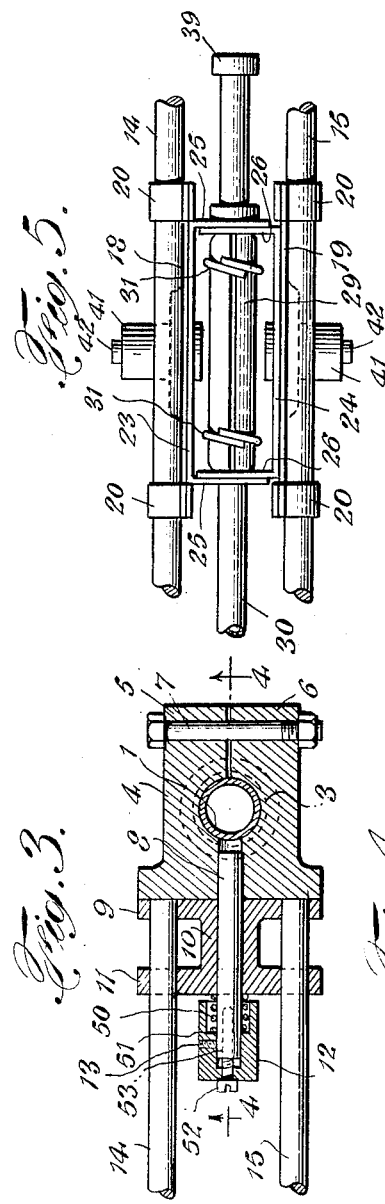
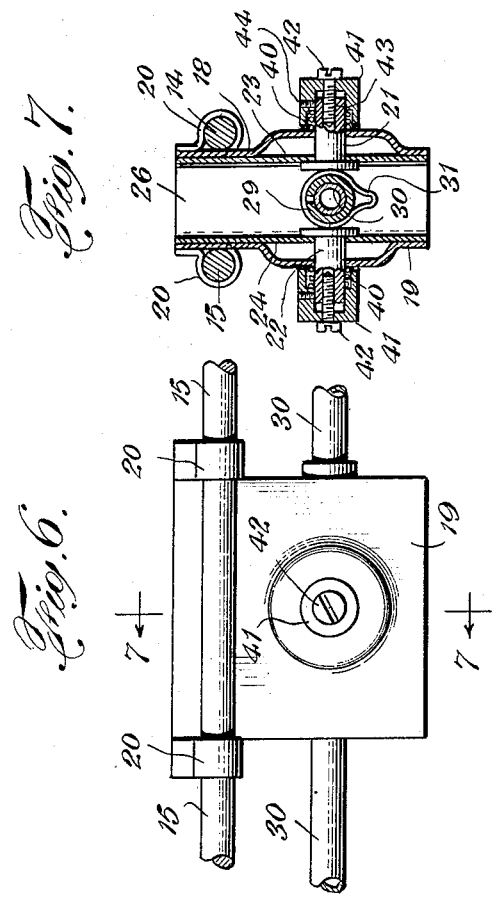
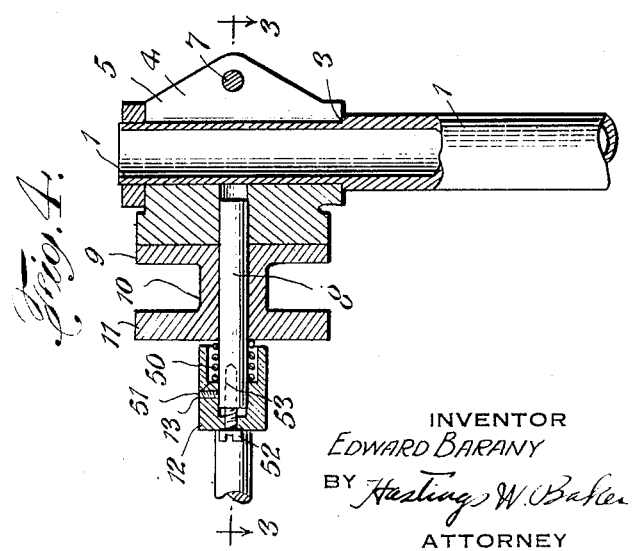

Patented Feb. 27, 1951

2,543,221

UNITED STATES PATENT OFFICE 2,543,221

UNIVERSALLY ADJUSTABLE BRACKET ASSEMBLY

Edward Barany, New York, N. Y.

Application August 4, 1945, Serial No. 609,000

9 Claims. (Cl. 248—281)

Adjustable bracket assemblies have heretofore been proposed for various purposes, such as a support for an electric lamp. The usual method of adjusting such assemblies is to loosen a wing nut, move the part to be adjusted to its adjusted position, and then to tighten the wing nut to hold it in the adjusted position. The object of this invention is to improve such adjustable bracket assemblies by providing for a universal adjustment so that the electric lamp, or other member to be supported, may be positioned to an adjusted position easily and quickly, and so that it would remain in the adjusted position without the necessity of loosening and tightening wing nuts or the like.

In the case of electric lamps, a workman frequently desires to shift the position of the lamp so as to position it in various positions.

It is well known that where it is necessary for a workman to frequently adjust a lamp so as to direct its rays into places not readily accessible, much time and labor is lost in attempting to make the necessary adjustments. This has frequently caused the workman to have to utilize the services of an assistant who would position the lamp wherever desired, so that the workman could see what he is doing. With my improved construction, this assistant is rendered unnecessary for the workman can readily position the lamp into any desired position, and having positioned it, the frictional engagement of one part with the part supporting it will hold it in its adjusted position.

The invention may be better understood by referring to the attached drawings, in which Fig. 1 is a plan view of my improved universally adjusted bracket assembly;

Fig. 2 is a side elevational view thereof;

Fig. 3 is a cross-sectional view on the line 3—3 of Fig. 4 showing the construction of the swivel connection between the guide rails and the standard constituting the upper right-hand portion of Fig. 2;

Fig. 4 is an elevational view, partly in cross-section, on the line 4—4 of Fig. 3;

Fig. 5 is a fragmentary plan view of the parts mounted on the guide rails;

Fig. 6 is a side elevational view of the construction shown in Fig. 5, and

Fig. 7 is a vertical cross-sectional view on the line 7—7 of Fig. 6.

The standard 1 is rigidly mounted on a base 2, which may be screwed or bolted to the floor. The standard 1 is provided with a shoulder 3, and a swivel 4 is rotatably mounted on the standard 1 above the shoulder 3. This swivel is bifurcated at its rear end forming ears 5 and 6, which are urged toward each other by means of a bolt 7. The parts are so made that there is a snug fit between the standard 1 and the swivel 4, and the bolt 7 is tightened so as to cause the proper frictional engagement between the swivel and the support.

The swivel 4 has secured thereto a pivot pin 8, on which is mounted plates 9 and 11 connected by a hub 10. The pivot pin 8 extends through the plate 9, hub 10 and plate 11. The thimble 12 is provided with a bore into which extends the left hand end of pin 8. The thimble 12 is provided with an internal shoulder 51. A spring 50 presses against said shoulder and the plate 11 pressing the plate 9 into frictional engagement with the swivel 4. A screw 52 passes through the thimble 12 and into a threaded bore 53 of the pin 8 and serves as a means whereby the pressure of the spring 50 may be varied. A set screw 13, when tightened, locks the thimble 12 on the pin 8.

Guide rods 14 and 15 pass through holes in the plates 9 and 11 and are secured in said holes. The plates 9 and 11 can rotate on the pivot pin 8, if the operator exerts sufficient force to overcome the friction between the plate 9 and the swivel 4, but in this case the guide rods 14 and 15 would move as a unit. At their ends remote from the plate 9 they are connected by a cross bar 16.

The guide rods 14 and 15 serve as a trackway for a carriage 17 consisting of two side plates 18 and 19 provided with straps 20 which surround the bars 14 and 15 respectively, so that the carriage can slide longitudinally of the guide rods, the straps 20, however, engaging the guide rods so as to provide sufficient frictional engagement to hold the carriage at the adjusted position on the guide rods, unless the operator should intentionally move the carriage. Of course, instead of using two guide rods 14 and 15, a single guide rod may be employed.

The side plates 18 and 19 are pivotally connected to plates 23 and 24 respectively by headed pivot pins 21 which plates 23 and 24 are provided with inwardly extending ears, the ears on the plate 23 being denoted by the reference character 25, and the ears on the plate 24 being denoted by the reference character 26. As will be noted from Fig. 5, the ears 25 and 26 overlap each other and are provided with holes, through which a bar 30 is slidable. The plate 18 is pressed against the plate 23 by means of a spring 40 in a thimble 41 which is held in position and adjusted by a screw 42 received in a threaded bore 43. The thimble 41 is locked to the pivot pin 21 by set screw 44. This same construction is employed in regard to the plates 19 and 24. The amount of friction between the plates 18 and 23 and plates 19 and 24 respectively can be varied by adjusting the thimble 41 on the pivot pin 21.

Between the ears 26 is a split bushing 29 surrounding the slide bar 30 and is urged into engagement therewith by means of springs 31. It is, therefore, apparent that the slide bar 30 can be moved longitudinally of the carriage 17 so as, for instance, to move from the full-line position thereof, shown in Fig. 2, to the dotted line position thereof and the support consisting of the plates 23 and 24, and their ears can be rotated on the pivot pins 21 and 22 so that the slide bar 30 can assume various angular positions relative to the guide rods 14 and 15, such as the dotted line position indicated by the reference character 32 of Fig. 2.

The slide bar 30 is hollow, and an electric light cord 33 passes therethrough to an electric light socket 34, to which is affixed a reflector and shield 35. The bar 30 is also provided with a stop 39 to limit its movement so as to prevent it being pulled out of the carriage. The bar 30 is provided with arms 36 connected to arms 37 of the socket 34 by means of pivot pins 38. The arms 36 and 37 are frictionally held in engagement with each other by the same spring and thimble arrangement as heretofore described in connection with the pins 8 and 21.

It is apparent that the reflector and the electric light housed therein can be moved on the pivot pins 38. The bar 30 can be rotated on its axis and can be moved longitudinally of the support therefor in the carriage 17. The support, consisting of the plates 23 and 24, can be rotated relative to the carriage on the pivot pins 21 and 22. The carriage 17 can be moved longitudinally of the guide rods 14 and 15. The guide rods 14 and 15 are secured to the plate 9 which can be rotated relative to the swivel 4 on the pivot pin 8, and the swivel 4 can be rotated relative to its support, which is the standard 1. Attention is furthermore directed to the fact that there is a frictional engagement between each adjustable part and the part supporting it, so that when the operator has placed the adjustable part in its adjusted position, it will remain, unless the operator exerts a force to move it to some other position.

I realize that many changes may be made in the specific form of the invention shown by way of illustration herein without departing from the spirit of the invention, and I, therefore, desire to claim the same broadly, except as I may limit myself in the attaching claims.

Having now described my invention, I claim:

1. In a universally adjustable bracket assembly, horizontally extending guide rods, a carriage frictionally but slidably engaging said rods, a support consisting of two plates having inwardly extending ears at each end thereof, pivot pins frictionally connecting said plates to said carriage, and a bar slidable through holes in said ears.

2. In a universally adjustable bracket assembly, a vertically extending standard having a shoulder thereon, a swivel rotatably mounted on said standard and supported by said shoulder, horizontally extending guide rods pivoted to said swivel, a carriage slidable on the guide rods, a support pivotally connected to said carriage, a bar slidable through said support, and frictional means to hold each of the movable parts in adjusted position relative to the part supporting it.

3. In a universally adjustable bracket assembly, a standard, a swivel, adjustable frictional engagement means for the rotatable mounting of the swivel upon the standard, guide rods, means for the rotatable mounting of the guide rods upon the swivel including adjustable friction rotation control means having a mounting plate, a pivot pin extending from the swivel and plate to an adjustable resilient locking member, and a carriage slidable upon the guide rods.

4. In a universally adjustable bracket assembly, a standard, a swivel, adjustable frictional engagement means for the rotatable mounting of the swivel upon the standard, guide rods, means for the rotatable mounting of the guide rods upon the swivel including adjustable friction rotation control means having a mounting plate, a pivot pin extending from the swivel and plate to an adjustable resilient locking member to provide frictional control, a carriage slidable upon the guide rods, a support pivotally connected to said carriage, a split bushing formed in said carriage for holding said support in adjusted position relative to said carriage, and adjustable frictional control means for holding said carriage in adjusted position upon said guide rods.

5. In a universally adjustable bracket assembly, a standard, a swivel, adjustable frictional engagement means for the rotatable mounting of the swivel upon the standard, guide rods, means for the rotatable mounting of the guide rods upon the swivel including a mounting plate, a pivot pin extending from the swivel and plate to a resilient locking member constituting adjustable friction rotation control means, a carriage slidable upon the guide rods, and a support pivotally connected to said carriage, comprising two plates having inwardly extending ears at each end thereof, pivot pins frictionally connecting said plates to said carriage, a split bushing mounted between said inwardly extending ears longitudinally of said guide rods, and a bar slidable through openings in said ears and frictionally engaging said bushing to hold said support in adjusted position relative to the carriage.

6. In a universally adjustable bracket assembly, a standard, a swivel, adjustable frictional engagement means for the rotatable mounting of the swivel upon the standard, guide rods, means including a mounting plate, a pivot pin extending from the swivel and plate to an adjustable resilient locking member to provide for the rotatable mounting of the guide rods upon the swivel friction rotation control means, a carriage slidable upon the guide rods, a support pivotally connected to said carriage, a bar slidable through said support, and adjustable frictional means to hold said bar in adjusted position relative to said support.

7. In a universally adjustable bracket assembly, guide means, a carriage slidable thereon, adjustable frictional control means for holding said carriage in adjusted position upon said guide means, support plates each pivotally connected to said carriage, adjustable frictional control means to hold said support plates in adjusted position relative to the carriage, means slidably supported by said plates, and adjustable frictional control means including a split bushing to hold said slidable means in adjusted position relative to the pivotal support plates.

8. In a universally adjustable bracket assembly, guide means, a carriage slidable thereon, a support pivotally connected to said carriage, means slidable in said support, said support including a split bushing surrounding the slidable means together with adjustable means for regulating the engagement of the split bushing and the slidable means for holding said slidable means in adjusted position relative to the support.

9. In a universally adjustable bracket assembly, guide rods, a carriage frictionally but slidably engaging said rods, a support consisting of two plates having inwardly extending ears at each end thereof, pivot pins frictionally connecting said plates to said carriage, and a split bushing mounted between said inwardly extending ears longitudinally of said guide rods, and a bar slidable through openings in said ears and frictionally engaged by said bushing.

EDWARD BARANY.

REFERENCES CITED

The following references are of record in the file of this patent:

UNITED STATES PATENTS

| Number | Name | Date |
|---|---|---|
| 661,051 | Horton | Nov. 6, 1900 |
| 951,319 | Krum et al. | Mar. 8, 1910 |
| 974,253 | Forg | Nov. 1, 1910 |
| 1,057,658 | Nichols | Apr. 1, 1913 |
| 1,190,502 | Anderson | July 11, 1916 |
| 1,408,834 | Seavey | Mar. 7, 1922 |
| 1,813,911 | Cinquini | July 14, 1931 |